(12) United States Patent  (10) Patent No.: US 7,684,784 B2
Parthasarathy  (45) Date of Patent: Mar. 23, 2010

(54) SYSTEM FOR SECURE COMMUNICATIONS

(75) Inventor: Sanjay Parthasarathy, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 945 days.

(21) Appl. No.: 10/907,238

(22) Filed: Mar. 24, 2005

(65) Prior Publication Data

US 2006/0217063 A1    Sep. 28, 2006

(51) Int. Cl.
    *H04M 1/68*    (2006.01)
(52) U.S. Cl. ............... 455/410; 455/67.11; 455/411; 455/423; 380/255
(58) Field of Classification Search ......... 455/410, 455/411, 423.16, 67.11; 375/132–137; 380/255
    See application file for complete search history.

(56) References Cited

U.S. PATENT DOCUMENTS

| | | | |
|---|---|---|---|
| 6,081,750 | A | 6/2000 | Hoffberg et al. |
| 6,181,711 | B1 | 1/2001 | Zhang et al. |
| 6,181,941 | B1 | 1/2001 | McCarthy |
| 6,308,043 | B1 | 10/2001 | Solheim et al. |
| 6,321,095 | B1* | 11/2001 | Gavette ............... 455/517 |
| 6,359,924 | B1 | 3/2002 | Kuhn et al. |
| 6,385,454 | B1 | 5/2002 | Bahl et al. |
| 6,400,996 | B1 | 6/2002 | Hoffberg et al. |
| 6,405,132 | B1 | 6/2002 | Breed et al. |
| 6,606,592 | B1 | 8/2003 | Cho et al. |
| 6,697,768 | B2 | 2/2004 | Jones et al. |
| 6,720,920 | B2 | 4/2004 | Breed et al. |
| 2003/0210680 | A1 | 11/2003 | Rao et al. |
| 2004/0203434 | A1* | 10/2004 | Karschnia et al. ........ 455/67.11 |
| 2005/0123138 | A1* | 6/2005 | Abe et al. ................ 380/255 |

OTHER PUBLICATIONS http://content.honeywell.com/uk/Press/experion.htm, Honeywell International, Inc., "Honeywell Introduces Experion PKS, Next Generation Process Knowledge System Driven for Results," 4 pages, printed Nov. 30, 2004.
http://www.darpa.mil/ato/programs/xg/index.htm, 1 page, printed Sep. 30, 2004.
http://www.darpa.mil/ato/programs/xg/overview.htm, 1 page, printed Sep. 30, 2004.
http://www.darpa.mil/ato/programs/xg/rfcs.htm, 2 pages, printed Sep. 30, 2004.
http://www.honeywell.co.za/marketing/releases03/0322.htm, Honeywell International, Inc., "Honeywell Improves Results in Refining and Petrochemical Applications with Process Knowledge Solution," 3 pages, printed Nov. 30, 2004.

(Continued)

*Primary Examiner*—Yuwen Pan
(74) *Attorney, Agent, or Firm*—Kris T. Fredrick

(57) ABSTRACT

A system having transmitters, receivers, transceivers, actuators, sensors, input/output rack, and/or a computer with application specific software and/or hardware, for secure communication and control. The system may use frequency hopping spread spectrum (FHSS) and encryption. Schedules for FHSS and encryption keys may be varied in variously elaborate ways. The system may utilize a distributed control system to manage the transmission and reception of signals, control operations, FHSS scheduling, changing of keys, and information.

16 Claims, 13 Drawing Sheets

OTHER PUBLICATIONS

Lelescu et al., "Video Skimming and Summarization Based on Principal Component Analysis," LNCS 2216, pp. 128-141, 2001.

Pavan et al., "Real-Time Adaptive Resource Management," Integrated Engineering, pp. 2-4, Jul. 2001.

XG Working Group, "The XG Architectural Framework Request for Comments," BBN Technologies, Version 1.0, pp. 1-16, prior to filing date of present application.

XG Working Group, "The XG Vision Request For Comments," BBN Technologies, Version 2.0, pp. 1-17, prior to filing date of present application.

"Integration of Honeywell TPS with Experion PKS," Honeywell, 22 pages, Jan. 2004.

Cichoki et al., "Adaptive Blind Signal and Image Processing," ICALAB for Image Processing, 3 pages, prior to filing date of present application, Mar. 2004.

* cited by examiner

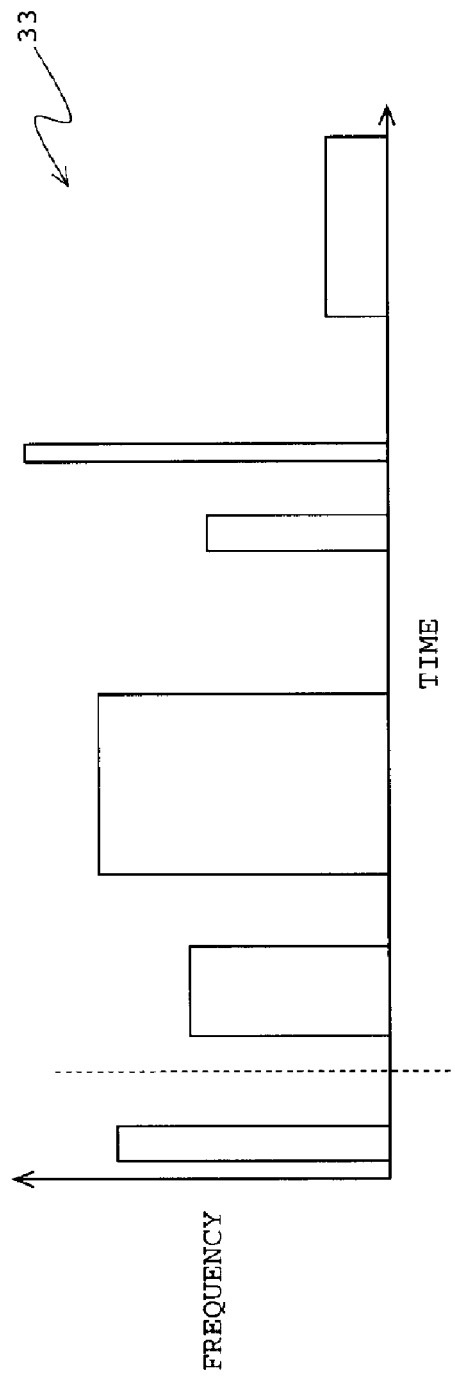
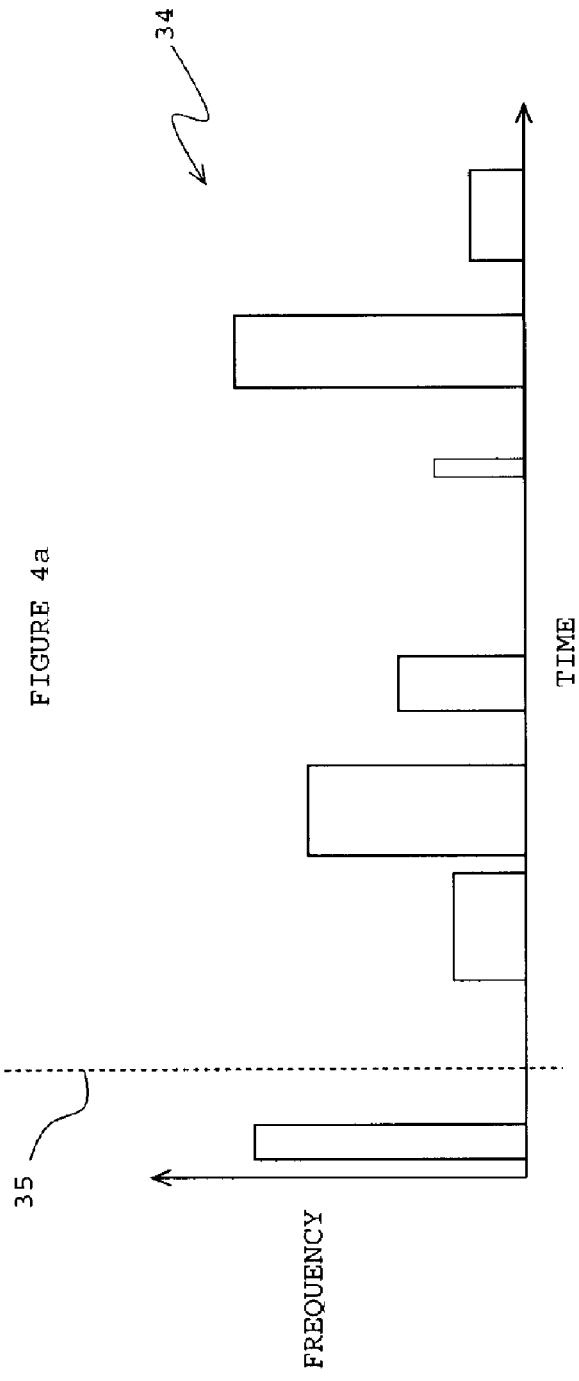

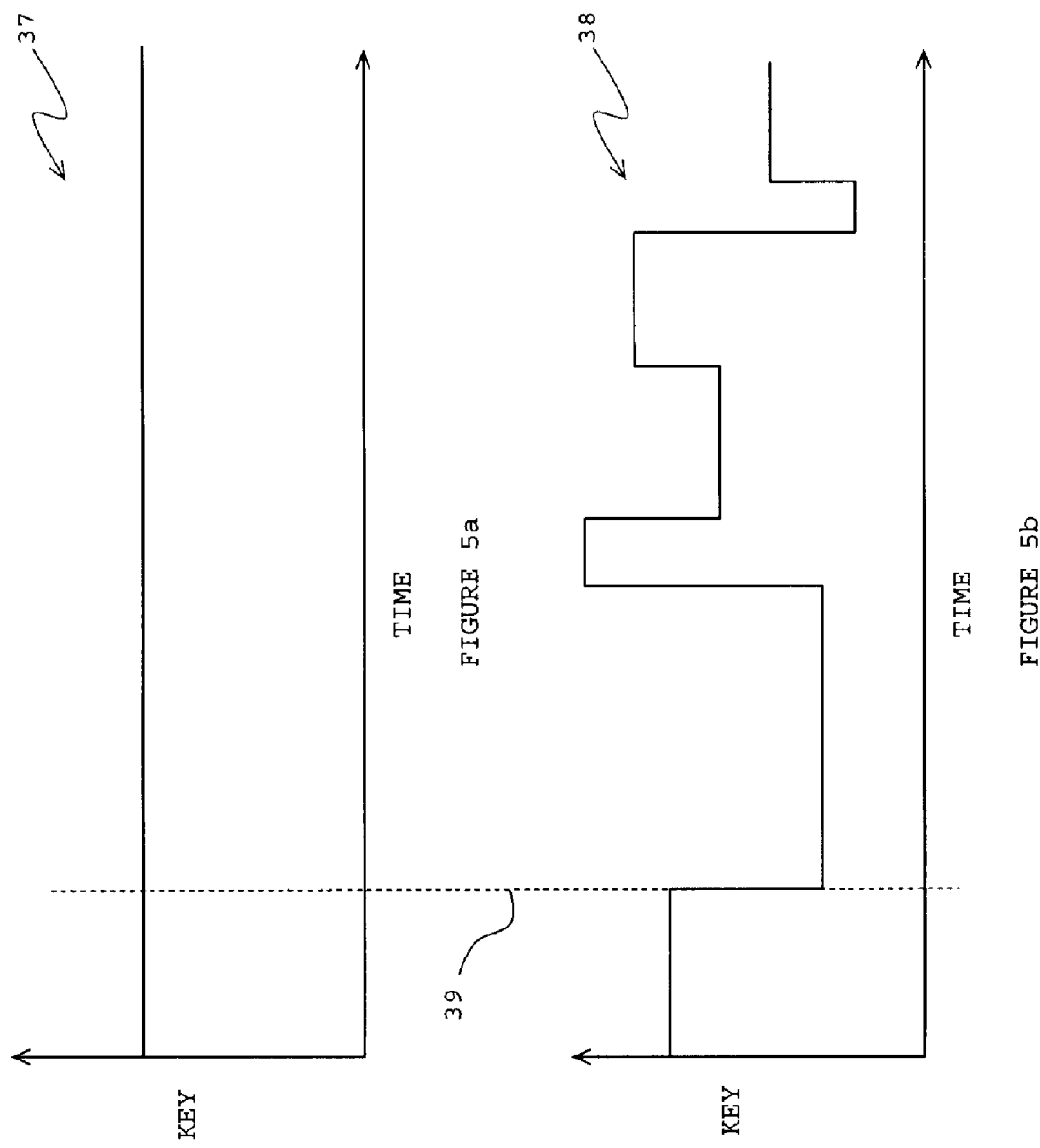

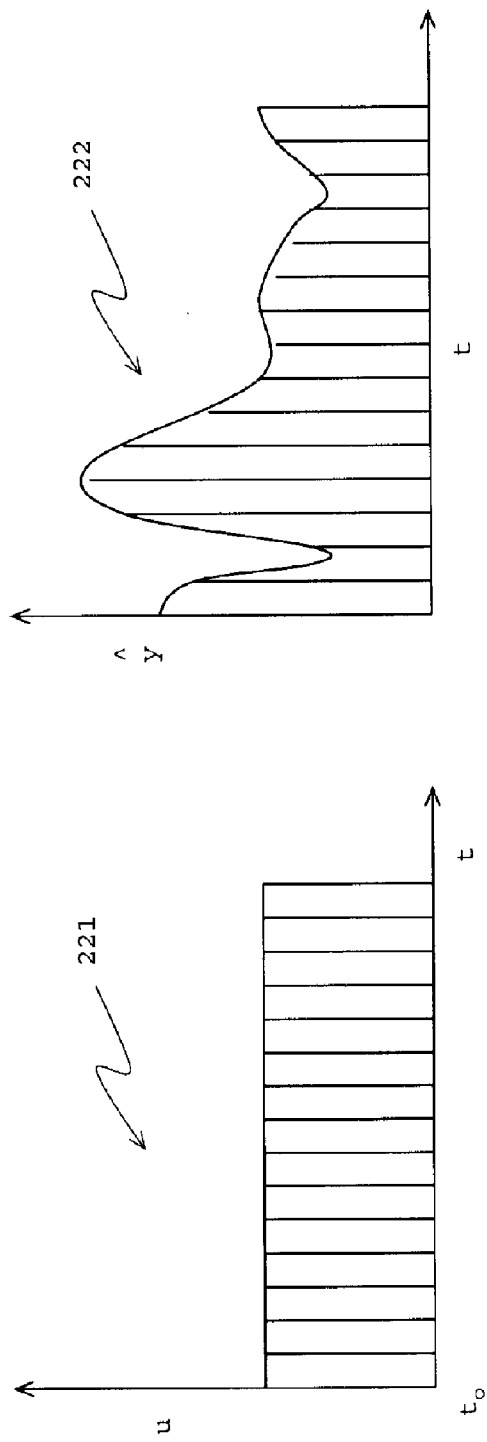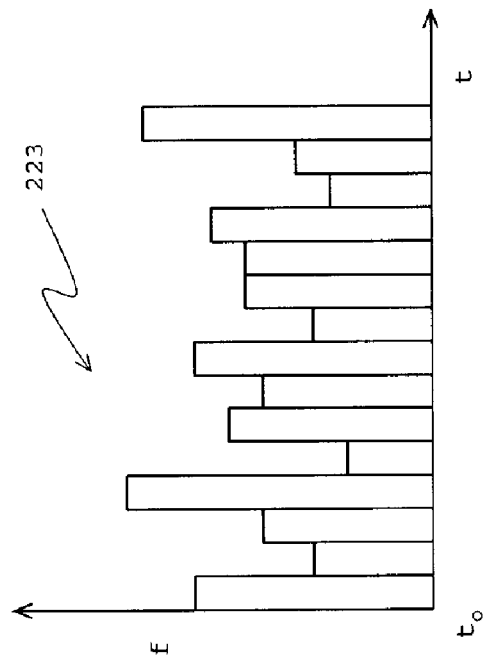
FIGURE 10a
FIGURE 10b
FIGURE 11

SYSTEM FOR SECURE COMMUNICATIONS

BACKGROUND

The invention pertains to communications and particularly to communication systems having characteristics for improving transmission of messages, data and the like. More particularly, the invention pertains to systems having characteristics for improved security of communications.

This patent document is related to U.S. patent application Ser. No. 10/906,066, filed Feb. 1, 2005, and entitled "Predictive Modeling System for Spectrum Use".

SUMMARY

The invention is a communication system having a control mechanism or system for selecting frequencies of communication for certain durations of time at particular times, along with encryption.

BRIEF DESCRIPTION OF THE DRAWING

FIGS. 4a and 4b show an example of spectrum management for secure transmission of signals;

FIGS. 5a and 5b show an example of key management for secure transmission of signals;

FIG. 10a is a graph showing frequency usage over time;

FIG. 10b is a graph revealing a prediction of success of transmission versus time;

FIG. 11 illustrates frequency hopping as a graph of frequency slots versus time slots;

DESCRIPTION

Figure 1:
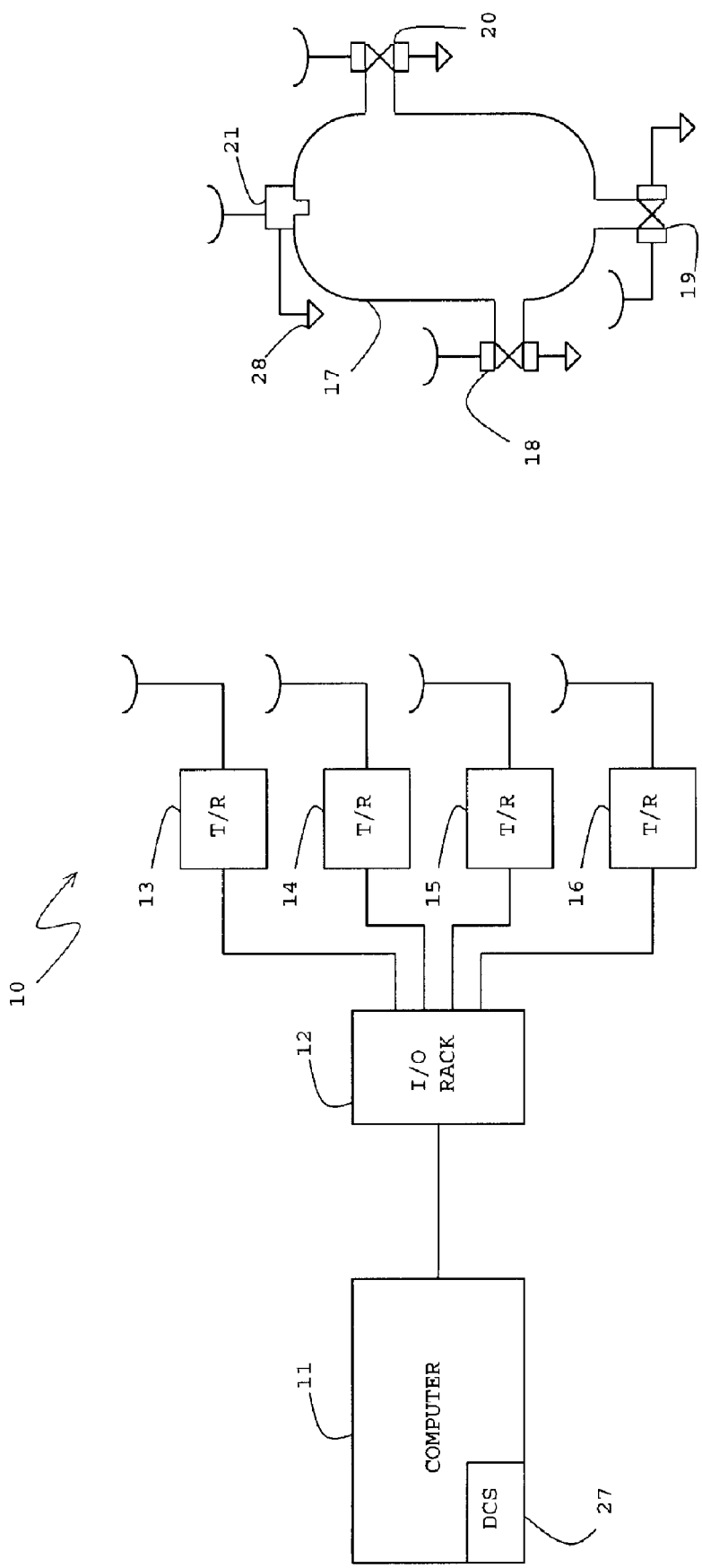
FIG. 1 reveals a system for secure wireless monitoring and control of a facility.

The invention involves various approaches for communication with good security for the communications. Frequency hopping spread spectrum along with encryption may be used for improving security. A numerous transmitters and receivers and/or transceivers may be used in a communication system. The communication system may be used for the conveyance of information and/or commands. For example, the system may utilize actuators and sensors and be used for monitoring and controlling a process in an industrial plant. Schedules for frequency hoping and keys for encryption and decryption may be used. There may be a computer connected to the transmitters and receivers to coordinate signals in the system. The computer may include a distributed control system such as a Honeywell Process Knowledge System (PKS™) to facilitate the operations of the system.

The system may also implement spectrum management to take an advantage of available holes, portions or frequencies in the present-day crowded spectrum. The term "holes" in the present description may mean portions available for present and future use in the spectrum. These holes in the spectrum may be exploited. However, the holes could be dynamic; for instance, a device may be transmitting at different frequencies at unscheduled times or at the same frequency on an infrequent basis. If the holes could be predicted, an intelligent wireless system could guarantee performance and secure communication in the face of a crowded spectrum, system uncertainties, jamming signals and interference.

A model of system use of a spectrum may be built with its basis in time measurements and times of which frequencies are being used and their amount of usage. The measurements may be transcribed into a topology of frequency use with a mathematical model. The model may be stochastic, i.e., involving a statistical and probability approach. The model may also include heuristics to be input by the user, so that the model is self-corrective. It may be adaptive in that it can "learn" from usage in a communication system.

The model may be used predictively to determine where the next hole (i.e., next available frequency slot) in the spectrum will be with a reasonable level of confidence, i.e., degree of probability. Then a transmission may be made at the noted frequency hole during the predicted time of availability. The present control system may monitor and record the successes and failures of transmission, and react to failures, jamming or other interference of transmission.

A stochastic model may be used to internalize the topology of frequency use. Afterwards, the model may be invoked at certain discrete intervals to predict an occurrence of and/or when and where the holes in the spectrum will be. The control system may then determine whether a transmission at the predicted hole or frequency is successful. If not successful, the system may take remedial action by retransmitting (if the interfering signal's duration is known or internalized in the stochastic model) or by looking for other holes that can be used for transmitting messages.

The stochastic model may use a variety of tools to internalize the frequency topology. Such tools may include Markov processes (hidden or embedded in some instances). A suite of predictive tools that may be used for the model includes model predictive control (MPC), internal model control (IMC), and stochastic control techniques. The tools may be used in the same manner that they be used in predicting computer usage. Computer usage predicting may be noted in an article entitled "Real-Time Adaptive Resource Management", by A. Pavan et al., "Integrated Engineering", pp. 2-4, *Computer*, July 2001.

The stochastic model and control algorithms may be embedded in the control system or device that is used for transmission and/or reception of signals. The model may be also distributed among a set of transmission devices to ensure redundancy in the event of failure of some devices in the set or network.

FIG. 1 shows a control system 10 incorporating a computer 111 which may have application specific hardware. The computer may incorporate a distributed control system (DCS) 27 such as for example, Honeywell's PKS™ (process knowledge system) by Honeywell International Inc. Control signals may go to an input/output (I/O) rack 12 where the signals are provided to a set of transmitters or transmitter/receivers (T/R's) 13, 14, 15 and 16. Rack 12 may be an interface between the computer and the T/R's. The transmitters may send wireless control signals to a set of actuators and sensors of a generic system, as an illustrative example, the process plant 17. The process plant 17 in FIG. 1 is a simplified example. Plant 17 could be a chemical plant, a manufacturing installation, a refinery, or other facility, having many sensors, actuators, such those of valves, control points, and so on. Control signals from T/R 13 may go to a valve actuator 18 which has a radio frequency (RF) receiver. A symbol 28 may indicate an associated device to be non-battery powered. Control signals from T/R 14 and 15 may go to valve actuators 19 and 20, respectively, which have RF receivers. Actuators 18, 19, and 20 may have indicators of valve openings connected to transmitters that send back RF signals indicating the degree of the valve openings. The valve opening information may be optional to a control system 10. A sensor 21 may provide information such as pressure, temperature or other information about the process of plant 17. Sensor 21 may have a transmitter that sends an RF signal to a receiver or transceiver 16 with information about the sensed parameter of plant 17. That information may be sent to the computer via the I/O rack 12 from the T/R 16. Likewise, valve position indications may be sent from the transmitters associated with valve actuators 18, 19 and 20 back to T/R's 13, 14 and 15, respectfully. The received signals may go to computer 111 via the I/O rack 12.

The aim or purpose of system 10 is to provide QoS (quality of service) and security "as good as wire". That means the wireless connection to be established may be as reliable and secure as hard-wired systems having control stations connected to plants. For good QoS, a variety of frequency-hopping spread spectrum (FHSS) schemes may be implemented. For FHSS, and the like, a frequency hop schedule may be fixed a priori (i.e., before system 10 is turned on). For security, there may be a keyed infrastructure managed by the computer system 11 or another similar system. The keys may be for encryption and decryption of signals, messages and information sent from a transmitter to a receiver. Keys may be coded sequences of bits that unlock a message, information or signals upon receipt by an intended recipient. There may be passwords or other keys for access to the encryption codes or keys. There may be static keys for a security encryption function that are fixed a priori. There may be dynamic keys that are determined "on the fly". Unencrypted data may be regarded as plain text; encrypted data may be regarded as cipher text. The may be asymmetric encryption or symmetric encryption. Management of the keyed infrastructure may be facilitated by a distributed control architecture (e.g., PKS™) associated with a processor of the system 10.

If hacking is detected, it may be because there is jamming, eavesdropping, or other QoS or security hindering activity. If keys are used for encryption and security, the keys may be changed as needed by human intervention. The keys may be transmitted to a receiver of signals via a way of communication other than that of the signals. If FHSS is used, the hop schedule may be changed for communications or signals between the relevant T/R(S/A) pairs. Both keys and FHSS may be used. Schedules of the FHSS may be transmitted to a receiver of the communications or signals via a way of communication other than that of the signals. At least portions of schedules or information relating to FHSS may be communicated to the receiver on a periodic basis (e.g., every five seconds or so), according to schedule, randomly, on request, and/or on a demand basis. FHSS information may be sent in an FHSS manner and may even be encrypted. Patterns, changes, times and ways of sending hop schedules may be facilitated by software defined radio. The patterns, changes, times and ways of transmitting keys may also be facilitated by software radio. Software defined radio (SDR) may be a collection of hardware and software technologies that enables reconfigurable system architectures for wireless networks and user terminals. SDR's may provide an efficient and comparatively inexpensive solution to the problem of building multi-mode, multiband multifunctional wireless devices that can be adapted, updated, or enhanced by using software upgrades. SDR's may provide software control of a variety of modulation techniques, wide-band or narrow-band operation, communications security functions (such as frequency hopping and encryption), and waveform requirements of current and evolving standards over a broad frequency range. As such, SDR may be considered as an enabling technology that is applicable across a wide range of areas in the wireless domain.

If there are redundant actuators or sensors and one or more of them fail or are compromised (i.e., the security of them is breached), the remaining actuators and sensors may be resorted to. An algorithm may be used to operate the system of the sensors and actuators in the event of an unavailable actuator or sensor (using principal component analysis or other approaches which may use information pertaining to the other actuators or sensors to develop a signal resembling the missing signal for or from the unavailable component). Knowledge of the actuator/sensor signal correlation may be exploited. Similar features and characteristics among the known signals may be imputed to the missing signal. An algorithm may be used to reconstruct an actuator/sensor signal in the event of, for example, jamming or eavesdropping, which eliminates or compromises the signal. Needs may include, among various things, a spectrum analyzer at the computer, a smart algorithm on the computer that checks the spectrum, involving spectrum management, and an intrusion detection and alerting algorithm which may involve signal correlation tests.

Figure 2:
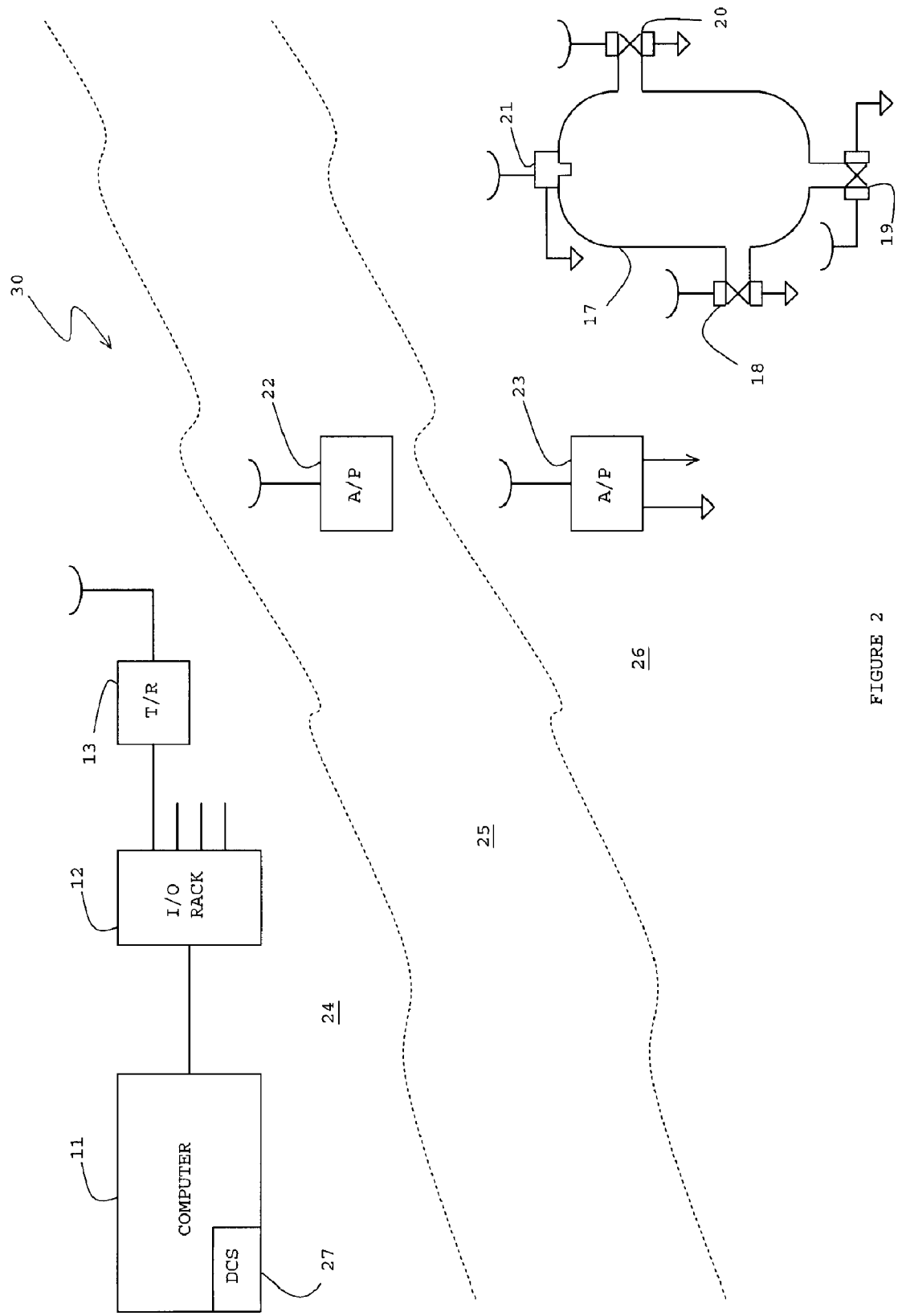
FIG. 2 shows a system like that of FIG. 1 but additionally includes a repeater subsystem.

FIG. 2 shows a system 30 that resembles system 10 of FIG. 1. System 30 may similarly have a computer 11 which has a distributed control system. Signals from computer 11 may go through an I/O rack 12 to various T/R's such as T/R 13, as an illustrative example. Signals from T/R 13 may go via a wireless medium to an access point or repeater 22. Repeater 22 may receive the signals from T/R 13 and transmit the signals on to another access point or repeater 23 which may in turn transmit the signals on to plant 17, specifically the actuator 18. Actuator 18 may take the received signals and change the position of the valve associated with the received wireless signals. That mode and route of transmission or their variants may be used for additional T/R's, actuators, and sensors.

T/R 13 may be in a region 24 somewhere in the country or world. Repeater 22 may be in another region 25 of the country, and repeater 23 may be in still another region 26 of the country or world. Signals transmitted by repeater 22 may instead go directly to plant 17 rather than via repeater 23.

Repeater 22 may be battery-powered and have receiver sensitivity and transmitter power limitations. Repeater 22 may be in a remote area not having power or it could be on a satellite. The satellite may make signal transmission available to plant 17 from nearly anywhere in the world.

Repeater 23 may be useful in that it is connected to regular power supply from a regular public utility line. This resource of power may permit the repeater to have excellent reception and transmission capabilities between the repeater 23 and plant 17, and repeater 22 or T/R 13, for instance, of system 30 of FIG. 2. However, repeater 23 may be more expensive than repeater 22 since it may have more features, such as high signal strength, encryption, more powerful transmitters, and so on.

Figure 3:
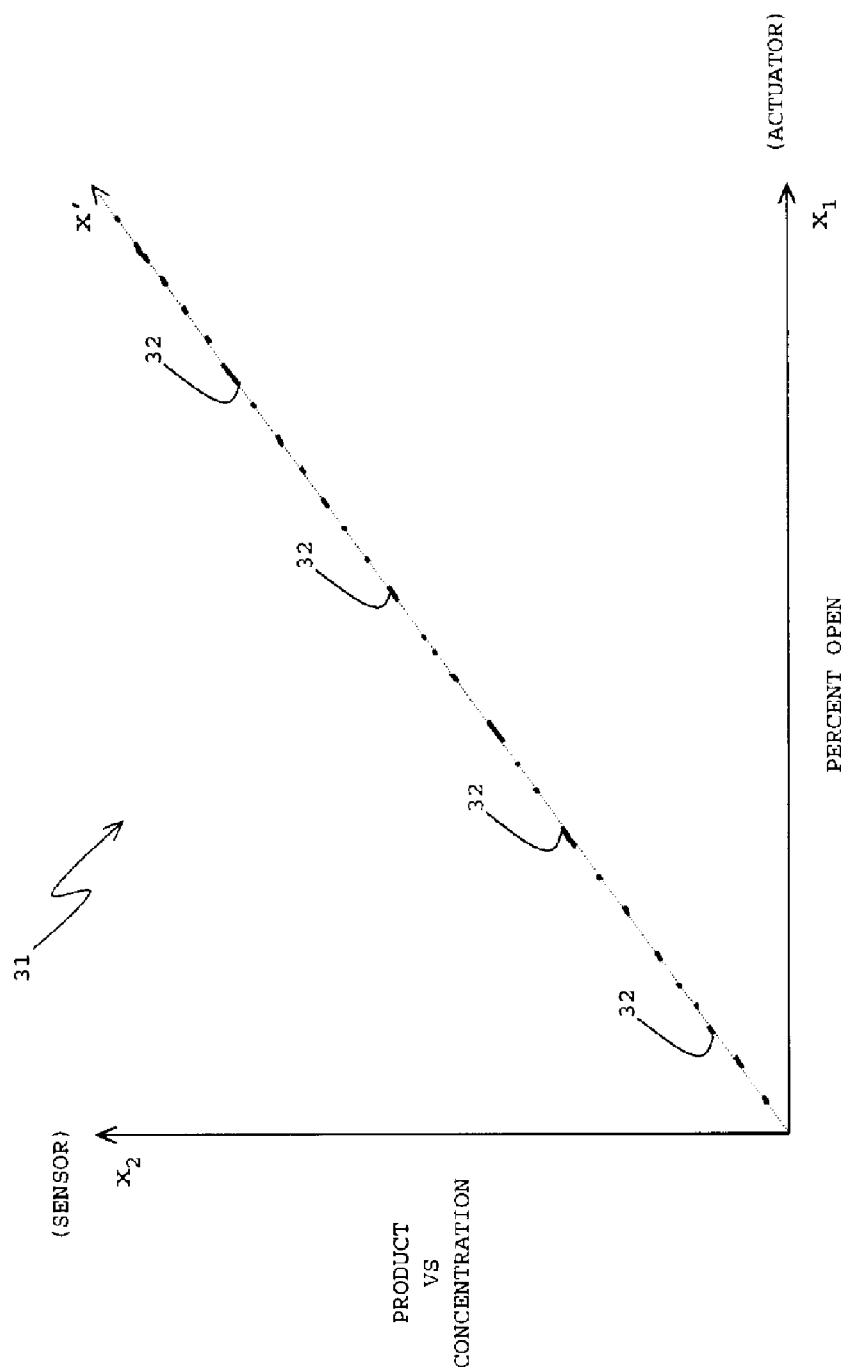
FIG. 3 is a graph illustrating an approach for inferring a signal from information about another signal.

FIG. 3 is a graph 31 illustrating the PCA approach where, with only one actuator signal available, one may infer the other. Two actuators are represented by points 32 of a plot x' on the graph. The $x_1$ axis represents the percentage opening of an actuator and its associated mechanism e.g., a valve. The $x_2$ axis represents a product versus concentration for a sensor. Similar items or features may enable the reconstruction of a missing signal of the other actuator. This approach may be applied for a reconstruction of other missing signals.

FIGS. 4a and 4b show an example of spectrum management of transmission and reception of signals for an actuator/sensor pair. A hop schedule may be changed routinely versus being changed when an intrusion is detected. FIG. 4a is a frequency versus time graph 33 that shows a "before state" of transmission using a frequency hop schedule before, for instance, an intrusion 35 during transmission. FIG. 4b is frequency versus time graph 34 that shows an "after state" of transmission using a different frequency hop schedule after the intrusion 35. It may be noted that the pattern of frequencies and durations of signals may be suddenly transformed from the pattern in FIG. 4a to that of FIG. 4b, upon detecting intrusion 35. The transformations or changes in patterns of frequencies and durations of signals may instead or additionally be routine.

FIGS. 5a and 5b show an example of key management of transmission and reception of signals for an actuator/sensor pair. A key schedule may be used routinely versus being used and changed when an intrusion is detected. FIG. 5a is a key versus time graph 37 that shows a "before state" of transmission using a key before, for instance, an intrusion 39 of transmission. FIG. 5b is a key versus time graph 38 that shows an "after state" of transmission after the intrusion 39. It may be noted that the pattern of keys' times of changes may be suddenly transformed from the pattern in FIG. 5a to that of FIG. 5b, upon detecting an intrusion 39 at that time. This transformation may instead be routine.

Figure 6:
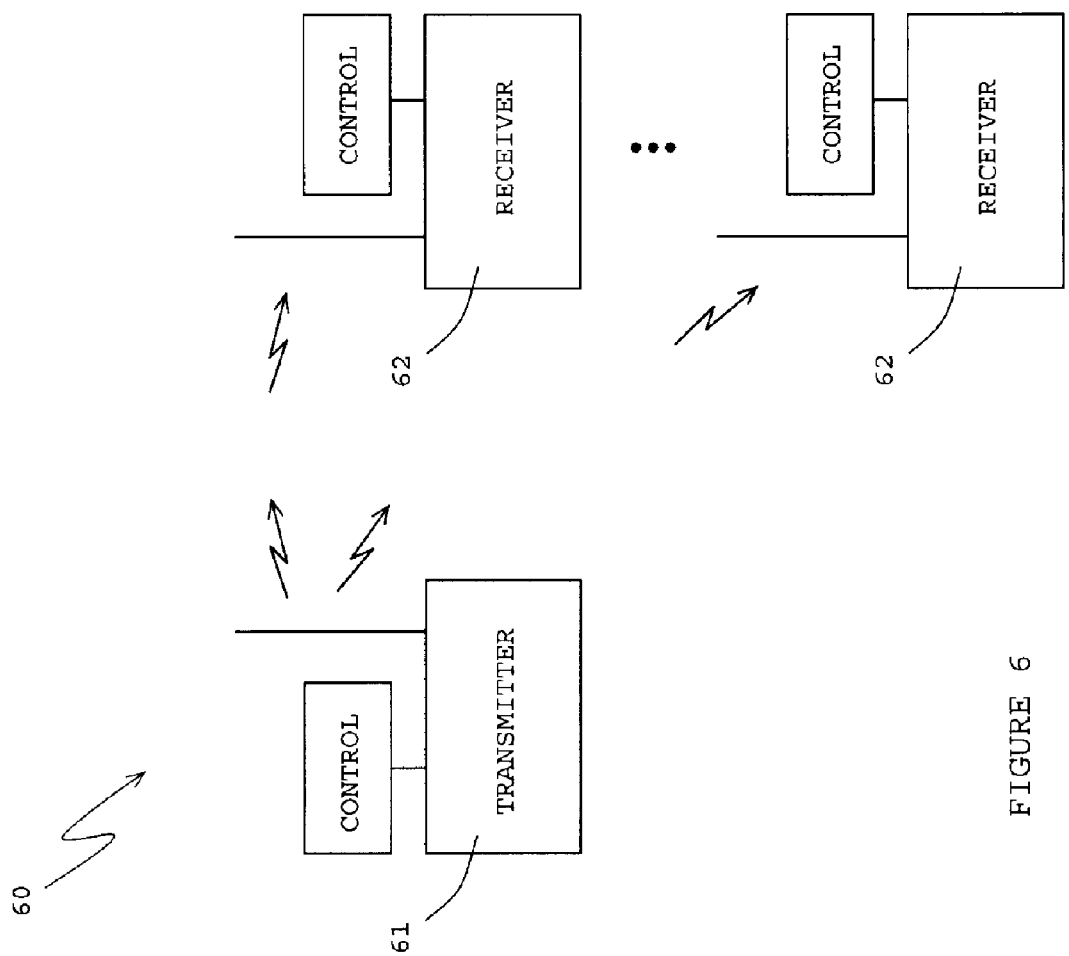
FIG. 6 shows a one-way communications system implementing a control mechanism.
Figure 7:
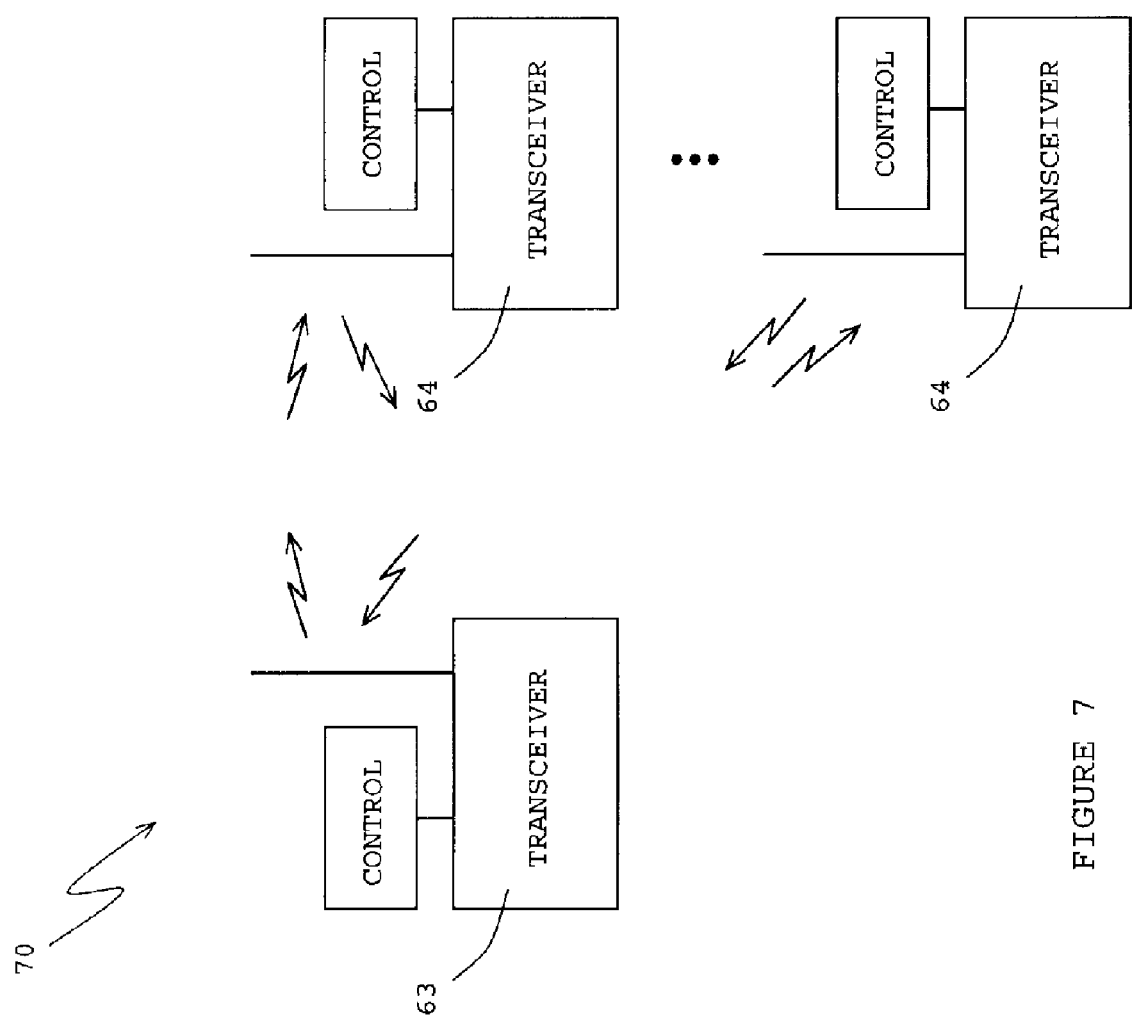
FIG. 7 shows a two-way communications system implementing a control mechanism.

The system 10 or 30 may resemble a one-way communications system 60 having a transmitter 61 and one or more receivers 62, as revealed in FIG. 6. Also the systems may resemble a two-way communications system 70 having two or more transceivers 63 and 64, as revealed in FIG. 7. One may illustrate the present invention for achieving secure and robust communications by looking at system 60. The transmitter 61 may first transmit messages to the receiver 62 in a wireless fashion on some portion of the electromagnetic frequency spectrum. The permitted portions of the spectrum for use in the U.S. may be determined by the F.C.C. When that aspect is known, then the approach for secure and reliable transmissions to receiver 62 may be provided for the present system. A good quality of service (QoS) may be achieved by system 60.

There may be associated with communications system 60 a control mechanism or system for determining frequencies of transmission, schedule of use of the frequencies, a basis for change of schedules of frequencies, the durations of times of transmission on the various frequencies. Plus the messages may be encrypted differently for each transmission. A process knowledge system may be utilized to control and manage the activities related to the communications systems 60 and 70.

Items that may compromise data transmission over a wireless communications system may include interference from other devices such as wireless telephones, jamming signals from hackers, microwave ovens, and so forth. A frequency hopping spread spectrum solution may be implemented in a wireless communications system to thwart interference and jamming. However, the frequency hopping schedule generally may be selected and programmed into the system only during installation and/or configuring. But with new devices being added to the system, it may become difficult to maintain the same quality of service (QoS) in the system because of more sophisticated and savvy hackers. The present invention may solve this QoS issue by leveraging the control system/data aggregation device in the system with which that all of the wireless devices eventually communicate.

A control mechanism or system, such as PKS™, may incorporate a state-of-the-art distributed control system and extend automation, control and knowledge contributions to processing, unification architecture, knowledge management, abnormal situation avoidance, optimization, and integration of systems. PKS™ may be a knowledge driven, continuously monitoring, collaborative, decision support mechanism for better managing the communication system. For instance, PKS™ may be utilized as a "frequency dispatcher" or a "key management mechanism" for the communications system. The communications system may broadcast a hop schedule, and change it periodically at a user-specified interval. Since only authenticated users may be granted access to PKS™, a higher level security may be maintained by having the PKS™ orchestrate the communication signaling scheme and the hopping schedule by announcing to each device, which the PKS™ knows about, what hop schedule will be for the next time interval. The PKS™ approach may alleviate "spectrum crowding" that is appearing to be a significant problem due to increasing usage of wireless devices. The communication system may be regarded in a generic sense by its incorporation of the PKS™.

Changes may include changing the scheduled updates to a frequency hopping schedule. The hop schedule may be changed at a non-periodic time. There may be a secret code that corresponds to a frequency hopping schedule. This code, like a password, may be changed at some schedule. It may be changed sporadically. The times of transmission at various frequencies may be coded. The transmissions may have different intervals according to a code and be at different frequencies. There may be a combination of cryptology used in the transmitted messages and secret codes involved in the times, durations and frequencies of portions of each message. There may be a synchronization between the transmitter and receiver relative to a start of a coded hopping schedule, for instance. Also, synchronization may be involved in decrypting an encrypted message. Such synchronization may be effected with transmitted signals.

Figure 8:
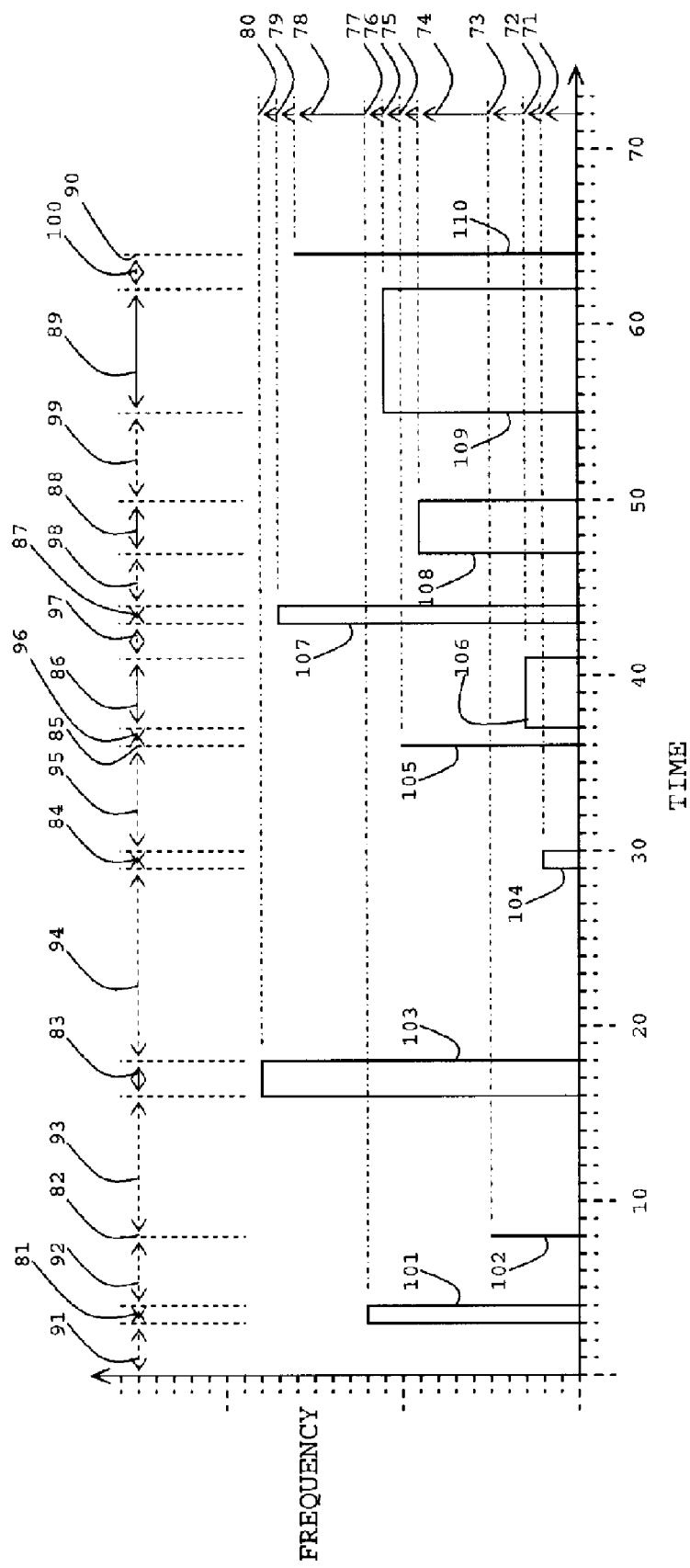
FIG. 8 is a graph of a transmission of a message showing pulses, their frequencies, delays between pulses and pulse widths.

FIG. 8 shows illustrative example of a transmission. The transmission of a message or data may be broken up into various portions such as a series of transmissions 101, 102, 103, 104, 105, 106, 107, 108, 109 and 110, as shown in the Figure. These transmissions may be of different frequencies 77, 73, 80, 71, 75, 72, 79, 74, 76 and 78, respectively. The transmissions may have various durations 81, 82, 83, 84, 85, 86, 87, 88, 89 and 90, respectively. The durations from the end of one pulse to the start of another pulse may differ from one another. There may be a time duration 91 from a start of the broadcast of the message, data, or other information, to the first transmission 101. Between transmissions 101 and 102, 102 and 103, 103 and 104, 104 and 105, 105 and 106, 106 and 107, 107 and 108, 108 and 109, and 109 and 110, there may be time durations 92, 93, 94, 95, 96, 97, 98, 99 and 100, respectively. Just portions of a message may be sent via the group of transmissions as shown in FIG. 8, and other portions of the message may be sent via another group or groups of transmissions either in a parallel fashion simultaneously or at different times. The message portions in one group may be situated in between message portions of another group or groups of transmissions. The messages themselves may be encrypted. The encrypted messages may be also encrypted, and so on. The above-noted transmission features may be provided by a software defined radio.

Transmitted messages may be coded with a principal component analysis (PCA) decomposition. For instance, the message may be coded into a coordinate system which may be involve a coordinate axis shift before transmission of the message which could be in a form of a matrix which may be decomposed into a product of two matrices, one with the plotted message and the other having the shift of the coordinate system. The decomposition may occur at the receiver of the coded and transmitted message. Part of the key to decomposition may be held by the intended recipient of the message.

There may be a repeater system that transmits a part of the message from an access point. The repeater sent part may be the withheld portion of the message. One may envision multiple redundant receivers that enable error-checking and flag any intrusions.

FIG. 8, which shows one group of transmissions, may represent amplitude modulated transmissions. However, the transmissions may consist of digital messages. Groups or portions of the groups of transmissions may be frequency modulated, phone modulated, double sideband modulated, single sideband modulated, quadrature modulated, and so on. Various kind and combinations of digital modulation techniques may also be utilized, such as amplitude shift keying, frequency shift keying, phase shift keying, (such as binary and quaternary) pulse amplitude modulation, pulse duration modulation, pulse position modulation, pulse width modulation, pulse frequency modulation, pulse code modulation, and so on.

Figure 9:
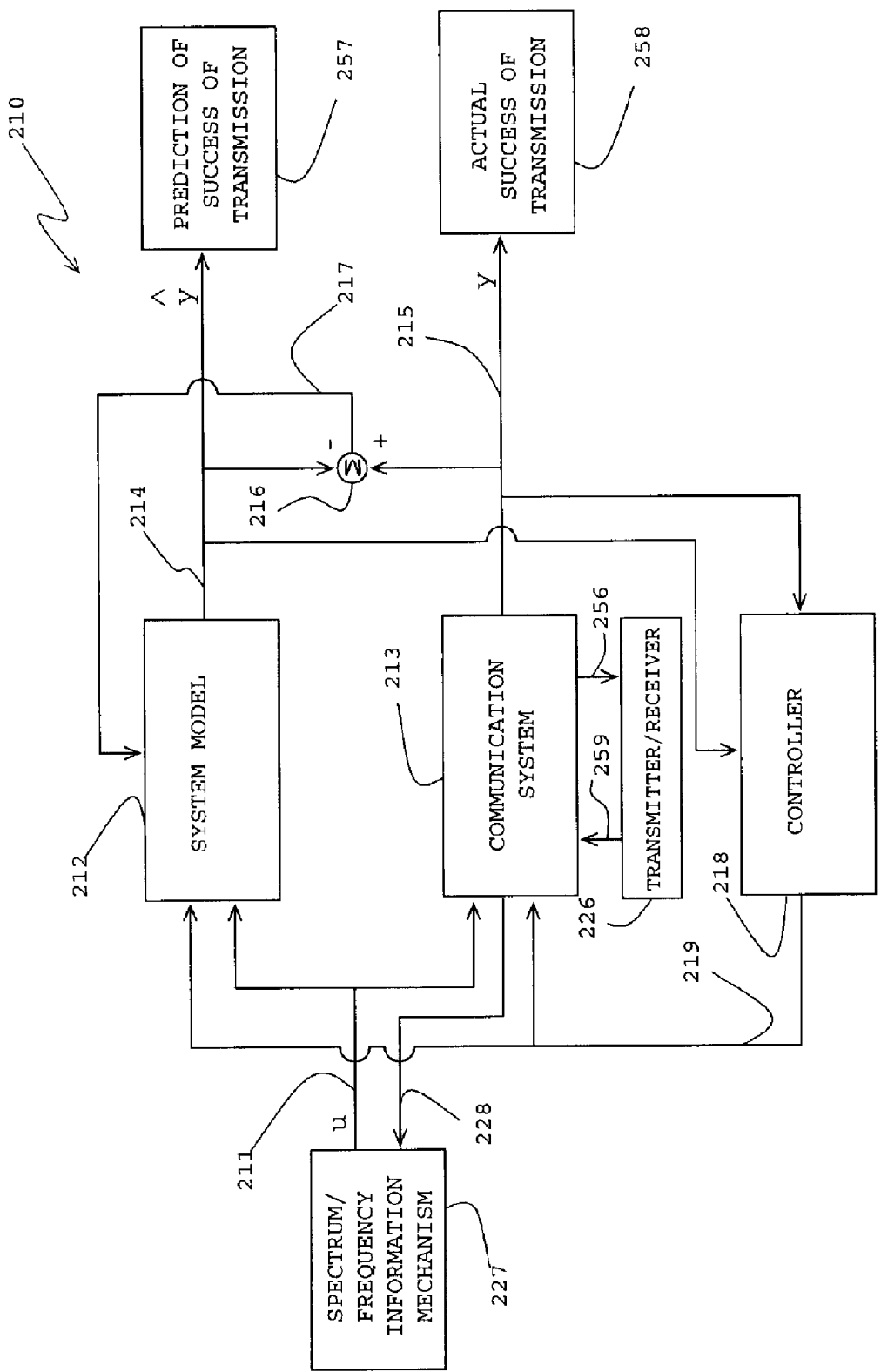
FIG. 9 is a block diagram of a system that may be utilized for predictive modeling for spectrum use.

FIG. 9 is a block diagram of a system 210 that may be utilized for predictive modeling for spectrum use. From a spectrum/frequency information mechanism 227, a signal 211 may be designated as "u" incorporating frequency usage over time, which would include the times and durations of use at the respective frequencies of the spectrum. Signal 211 may go to a system model 212. An output signal 214 from system model 212 may be $\hat{y}$ which provides a prediction of success of transmission, as noted by indication 257, or a figure of metric like Quality of Service (QoS). QoS may include success of transmission, timeliness of the message (or latency) and the integrity of it. Signal 211 may also go to a communication system 213 which may include a transmitter 226 to be used. Transmitter 226 may receive its control and monitoring from the communication system 213 via a connection 256. Transmitter 226 may provide its frequency and time usage of the spectrum to the communication system 213 via connection 259. The frequency and time usage of the spectrum may go from communication system 213 to spectrum/frequency information mechanism 227 via connection 228. An output signal 215 from communication system 213 may be "y" which indicates the actual success of a transmission, as noted by indication 258, or QoS. Signals 214 and 215 may go to an adder-subtracter 216 where signal 214 may be subtracted from signal 215 to result in an error signal 217 which may be fed to system model 212 to adjust and/or update the prediction (or system) model. The error signal 217 may be the difference between the actual success of transmission and the predicted success of transmission. The signal 217 may also have a corrective effect on the system model 212 and its output 214.

The signal 214 may be fed to a controller 218 to provide a prediction of success of transmission or QoS at a particular frequency at a certain time, or a plurality thereof. Signal 214 may have an adjusting effect on the controller 218 relative to an output signal 219. Signal 215 may be input to controller 218 to indicate if there was an actual success of transmission or QoS. Signal 219 may be output from controller 218 to provide input for a possible change of the frequency and time of usage by communication system 213. Signal 219 may also be input to system model 212. The algorithms and hardware for secure encryption and dynamic key changes may be implemented within the controller 218.

FIGS. 10a and 10b are graphs having curves 221 and 222, respectively, of u (frequency usage) over or versus time, and $\hat{y}$ (prediction of success of transmission) over or versus time t. One may note that if u is constant over time as shown with curve 221 in FIG. 10a, the system model 212 output $\hat{y}$ of QoS or prediction of success of transmission curve 222 of FIG. 10b may be non-constant over time t. This could happen due to interference signals in the spectrum. The time scale may be marked off in equal increments which are similar for curves 221 and 222. One may ask what should be the next u value be to maximize the QoS value signal $\hat{y}$ . QoS may depend on a transmitter's use of a hole in the spectrum and what other transmitter may be using that particular hole and at what times. Here is where the prediction may come in. At any one time, much of the spectrum may be in use. Some areas of the spectrum may be more crowded than other areas. If the present predictive modeling system were used by all actual and prospective spectrum users, usage of the spectrum could be increased many times.

Prediction may involve predictive de-confliction. A success factor may involve several parameters of significance which are those of QoS such as latency, i.e., time delay. Even though the transmission may be successful, it may not be of much good if it is slow getting to its expected recipient and its lateness results in the transmission being of less or no value. There may be a factor of message integrity to consider in transmissions. The message may succeed but there may be one bad bit in a digital transmission, which may affect the integrity of the message in the transmission. Integrity of the message may be of particular concern in a secure communication where the transmission succeeds but the encryption or decryption does not work. Secure key encryption, cyclic redundancy checking (CRC), and the dynamic key and password changes discussed in this document are some of the techniques that may be used to detect and mitigate security intrusions.

Signal 211 u may indicate a particular frequency that a transmitter is using over time or it may indicate amplitude and frequency usage at certain moments and durations of time. The transmitter may be hopping frequencies; for example, it may hop to preset frequencies at prescribed times. A software program may be utilized to perform such frequency hopping. Graph 223 of FIG. 11 shows an example of frequency hopping which is illustrated in the form of frequency slots versus time slots. The duration of the time slots may be in the range of milliseconds. Thus, the transmitter may hop from one frequency to another many times a second or minute. The transmitter and receiver operations should be configured relative to this graph of information, as applicable, which may be in a form of a table. However, the table may change dynamically. The actual usages u indicated by signal 211 may dynamically change the table in accordance with the overall system 210 of FIG. 9. The signal 211 u may be a case of frequency hopping or the frequency at which the transmitter is broadcasting. Prediction of holes in a spectrum may be useful for planning frequency hopping. Hopping may involve encryption and integrity of the messages being sent. There may be some redundancy as desired in certain circumstances.

The error output 217 of overall system 210 may update and adjust the system model 212 providing the prediction signal 214. The prediction signal 214

$\hat{y}$ may be sent to the controller 218 as guidance in forming the signal 219 indicating available frequencies and times for the transmitter of the actual communication system 213 to use. The controller 218 may do a multi-step prediction far ahead of the present moment, which provides the best control of spectrum selection or frequency hopping. This approach may be an optimization of frequency hopping. Such action may be in real-time. The simulation may be faster than real time to determine the control action to take at the present time. Changes from moment to moment of the predictions and their bases may be taken into account.

Figure 12:
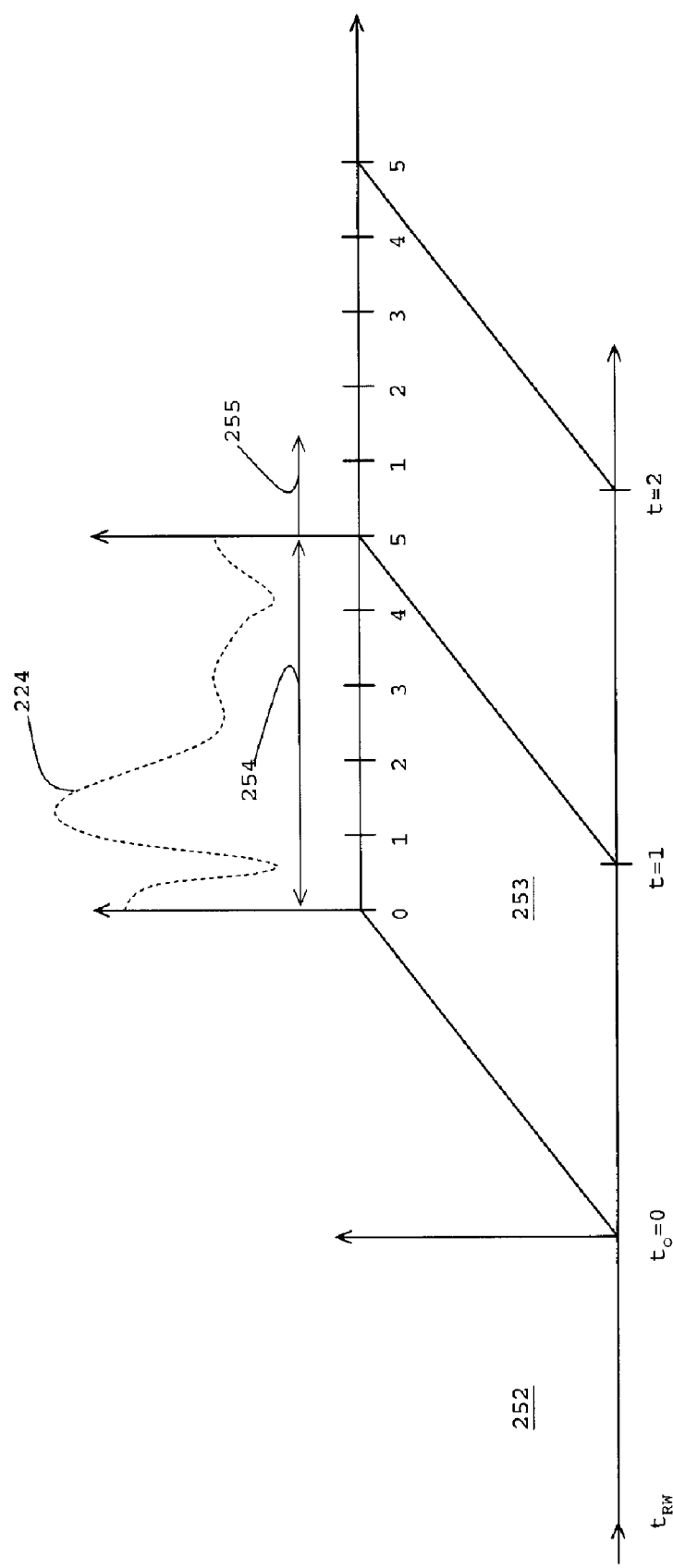
FIG. 12 is a graph of a predictive model contour.

FIG. 12 illustrates the real world 252 during $t_{RW}$ up to $t_o=0$ and a prediction of what the system might be able to do after $t_o=0$ in the simulated world 253, for instance, in the 5 time slots up to $t=1$ to the right as shown by curve 224 along simulated time 254. At time line 255, the input for the controller 218 may again be computed and implemented. At $t=1$, the prediction may be recomputed, i.e., updated. That may be needed since there are ongoing environmental changes, frequency usage changes, and so on. The prediction may be updated for the next 5 time slots. The number of time slots for each prediction or update may be arbitrary.

For time line 254, the prediction may be a of a predictive model contour 224 at the output 214 of the system model 212. System model 212 of overall system 210 may be realized with model predictive control (MPC), internal model control (IMC), or other like software and stochastic control techniques.

Relative to predictions, there may be a receding horizon control (RHC) in which the prediction horizon may recede if transmission time is limited. In other words, predictions are not made beyond the time that the transmission is scheduled to stop. Here, the overall system 10 may go into a terminal state. Although in some frequency spectrums, usage has no terminal state, e.g., cell telephones.

There may be a number of transmitter/receiver (T/R) devices connected with a centralized predictive modeling system which may have a central processor making decisions for assigning frequencies for these devices. However, the T/R devices may be decentralized and the decisions for assigning the frequencies be distributed to each device. Some de-confliction among the various devices may be needed. So even if the decisions for frequencies are decentralized, they are not necessarily totally decentralized. Each of the T/R devices may have a spectrum analyzer and a processor for making its own decisions about frequency use. There may be interconnections among the devices. Each may take into account the whole frequency spectrum or some a priori assigned portions of the spectrum to various T/R devices.

Frequency selection by a T/R device may depend much on who is broadcasting in the particular geographical area where the specific T/R device is located. An analogous situation may be a railway system having various geographical areas where each train is located. A specific train may have a particular itinerary which may involve certain geographical areas that it may be going through relative to getting to its destination. There may be an interchange of information. Theoretically, the centralization and decentralization approaches should result in the same answers, whether a frequency selection for a pair of transmitter and receiver devices or a rail selection for a train. The centralized approach may be regarded for selecting the global optimum for all units. The decentralized approach may be regarded for selecting the local optimum for the local unit having a mission. The latter may often have more concern for the local environment rather than the global environment. Decentralization may become less expensive than centralization. Decentralization may also be computationally simpler. The decentralized system may provide greater probabilities for selected frequencies for an individual T/R device than the centralized system.

If there are two sets of transmitter/receiver devices wanting to use the same frequency, there may be a negotiation involving time-share on that frequency which may be similar to track-share of a railway system. One may incorporate partitioning time/frequency/code (PTFC) to resolve conflicts between the sets. There may be a code with established techniques for distributing information. So there may be code distribution among the sets or units. Some approaches that may be used are code divisional multiplexing (CDM) with application for cell phones, and time domain multiplexing (TDM). There may be a software-defined radio which involves and is leveraged by the present adaptive predictive model control (PMC). The PMC may be adaptive in that it is improving at every time-instant and helps one to find and use quick and efficient solutions successfully in a decentralized system.

One end goal is a rapid deployment of wireless networks in a new environment. This may be a good use. A bad use may be the jamming of certain frequencies and making holes in the jamming for one's own information or use. Such jamming may be coded much like the enigma machine approach used during WWII. The other side of a conflict may jam GPS and communication signals. There may be noise in the regular signals, possibly including a code in them.

A model based control may do a prediction from a certain one time such as $t_o$. It may be rather easy to implement in the present invention a transmitter/receiver device, a sensor, plug and play, some numbers, slots opening up, autonomous selection, and/or reconfiguration by the controller whether it be centralized or decentralized.

An example of a system for model prediction of spectrum use may include a stochastic model of spectrum use base on a time-sequence usage of frequencies, an adapting model based on environmental conditions (i.e., present usage, future usage, spots, locations and interference), model based controller development and a model predictive controller.

Figure 13:
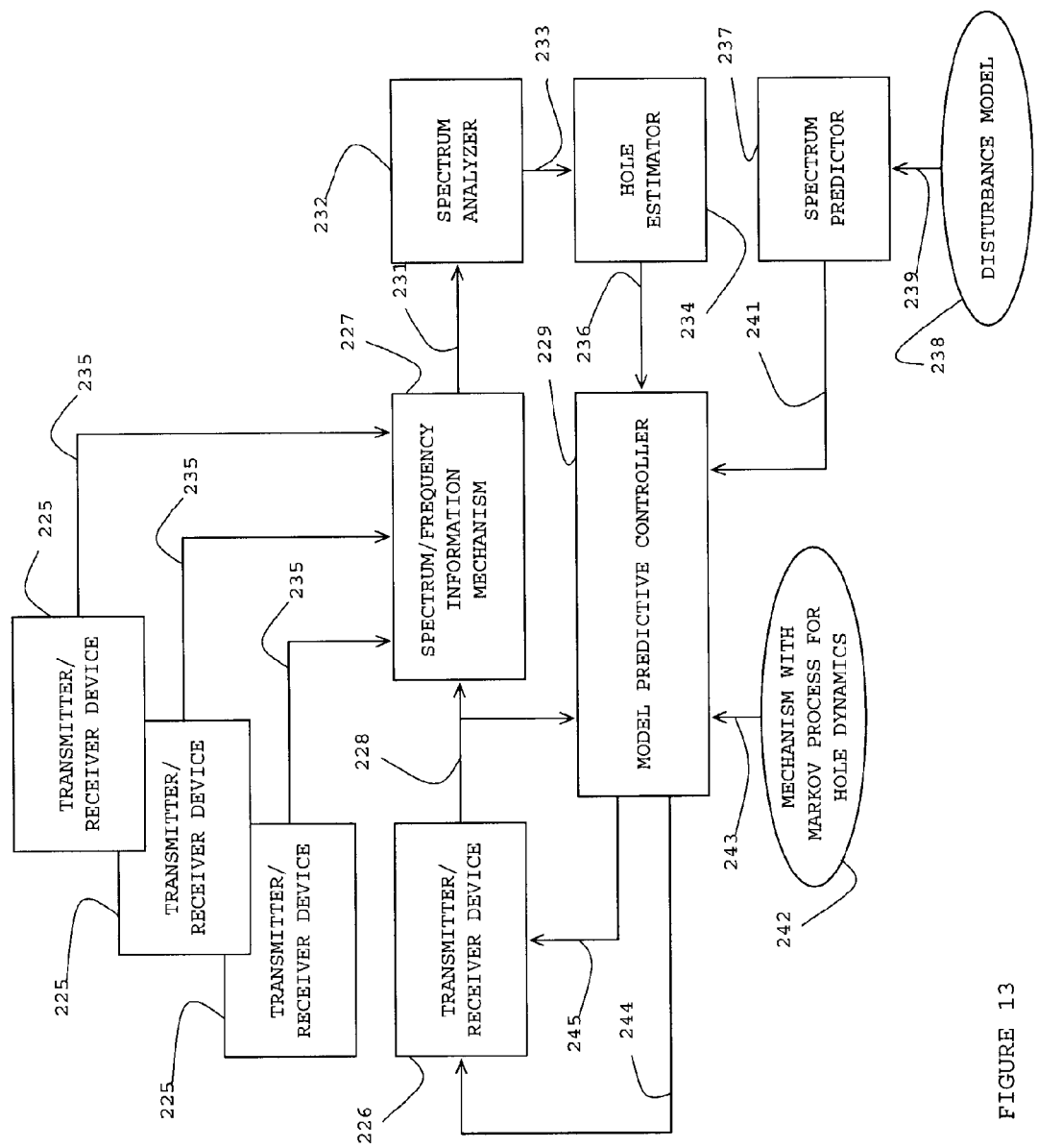
FIG. 13 is a block diagram of a predictive model controller having an input of parameters relating to spectrum usage and computing spectrum availability for use by a transmitter/receiver device.

FIG. 13 reveals a schematic of a multiple of transmitter/receiver devices in conjunction with a model predictive controller 229. Three T/R devices 225 are shown but there could be many more or fewer T/R devices using the spectrum that a T/R device 226 would like to use. Outputs indicating the usage of the various frequencies of the various T/R devices 225 as signals 235 may go to a spectrum/frequency (usage) information mechanism 227. An illustrative example of finding a hole for a T/R device 226 that one may want to use is shown. The T/R device 226 may output a signal 228 indicating its spectrum use. Signal 228 may go to the information mechanism 227 and the model predictive controller 229. From the spectrum usage information of the T/R devices 225 and 226, an output signal 231 representing that information may go to a miniaturized spectrum analyzer 232. The spectrum may be analyzed in view of the T/R device usage. Analysis results in the form of a signal 233 may go to a hole estimator 234, which in view of the spectrum analysis results, particularly as accumulated over time, may provide a history of holes and estimates of where the holes in the spectrum appear and at what times and durations. The hole estimator 234 may send estimates, based on the information in signal 233, as a signal 236 to the model predictive controller 229.

A spectrum predictor 237 along with a signal 239 from a disturbance model 238 may predict "surge events", interruptions and upcoming transmissions in the spectrum, and provide that information as a signal 241 to controller 229. A mechanism 242 may provide a Markov process for hole dynamics as a signal 243 to the controller 229 to aid the controller in dealing with the estimation of holes signal 236 from hole estimator 234 in conjunction with the other signals 228 and 241 received by the controller 229. Controller 229 may use a spectrum model and a history of holes to determine the frequency hole most likely to be empty for the next "x" milliseconds, seconds or minutes. A signal 244 indicating a broadcast frequency selected or a frequency hop sequence in view what is predicted to be available may be sent to the T/R device 226 to be used. Also controller 229 may indicate with a signal 245 to device 226 how many seconds (i.e., x seconds or the like) that the hole or holes (if a hop sequence) specified in signal 244 will likely be available. Also, signal 245 from controller 229 may indicate the future times that certain holes will likely be available.

Figure 14:
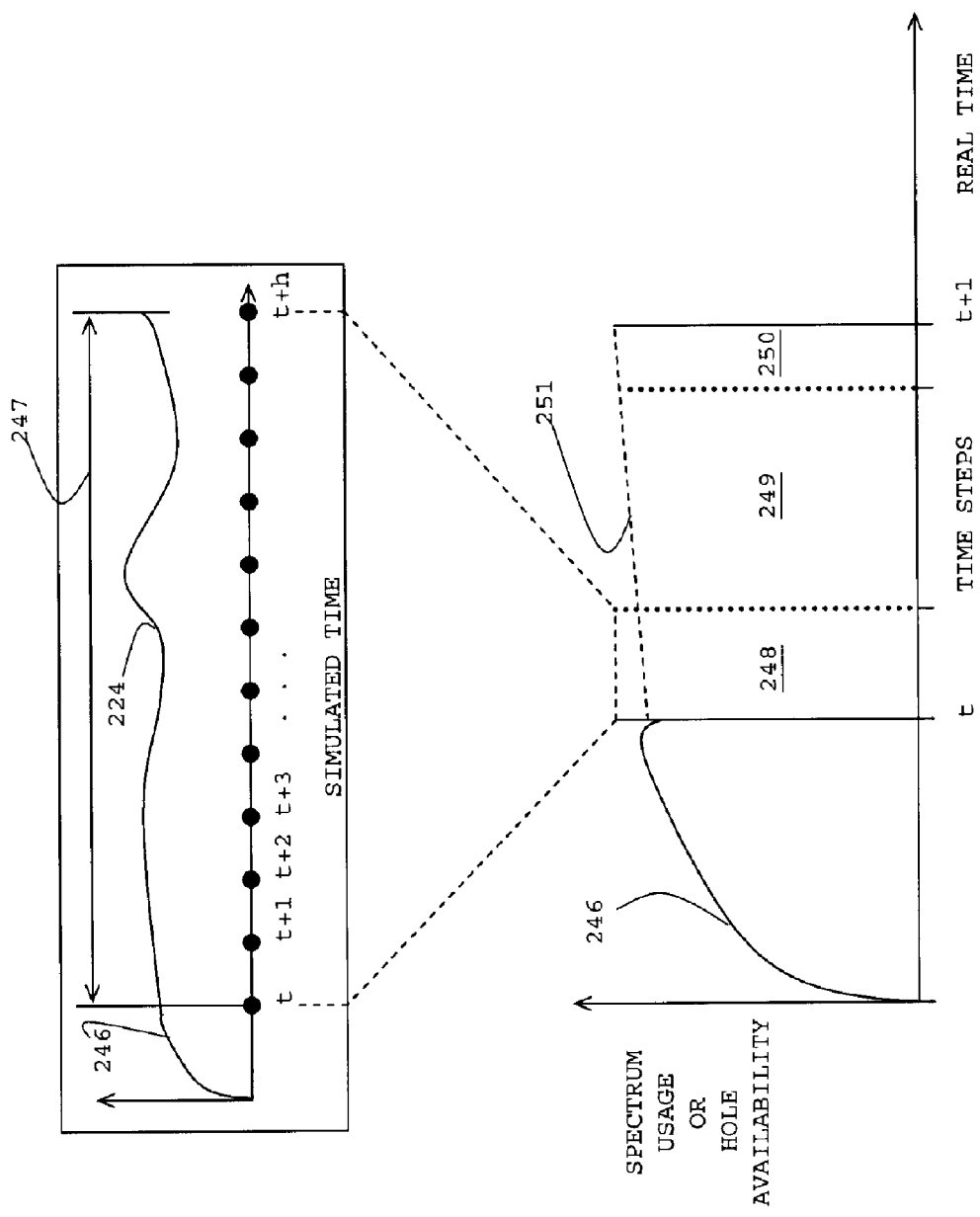
FIG. 14 illustrates a model predictive control for frequency hopping which is illustrated in the form of frequency slots versus time slots.

FIG. 14 reveals an approach of the model predictive controller 229. As noted above, spectrum usage and/or hole availability information may be provided to controller 229. The controller may use observed past and present spectrum usage and a history of holes as shown by curve 246 to form a model for prediction. The model may be used for predicting the availability of the spectrum for usage. The predictions may use the model for the next "h" steps (with an assumed input and noise profile). The h steps may extend for a horizon length "h" as shown by line 247 in FIG. 14. Predicting for the future as represented by simulated time (i.e., t+1, t+2, t+3, . . . t+h) may be shown by the predictive model contour 224. That may be the "predict" stage 248 which is the first phase of the model predictive control as shown in the spectrum usage or hole availability versus real time graph with time steps t and t+1 shown on the abscissa axis. The next stage 249 may involve the use of the predictions to compute an optimal input at "t+1". At the next stage 250, the computed input 251 may be implemented at "t+1". Occasionally, the model that approximates the profile 246 may be updated or adapted, such as every 15 minutes or so.

In the present specification, some of the material may be of a hypothetical or prophetic nature although stated in another manner or tense.

Although the invention is described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A communications system comprising:
 at least one wireless transmitter;
 at least one receiver; and
 a processor connected to the at least one transmitter; and
 wherein:
 the at least one transmitter may send encrypted signals on various frequencies at various times;
 the at least one receiver may receive encrypted signals;
 a schedule of encryption keys and frequencies for transmission is provided as needed to the at least one receiver;
 the schedule of encryption keys and frequencies changes from time to time; and
 the processor manages a development of encryption keys, a providing of encryption keys to the at least one receiver, and/or a determination of a schedule of times and frequencies of transmitted signals, wherein the encryption key is changed upon a detected intrusion of the signals.

2. The system of claim 1, wherein the processor comprises a distributed control system to manage signals, transmission of the signals, encryption of the signals, development of encryption keys, providing current encryption keys to the at least one receiver, determination of schedules of times and frequencies of transmitted signals, and/or providing current schedules of encryption keys and frequencies to the at least one receiver.

3. The system of claim 1, further comprising:
 a second at least one transmitter; and
 a second at least one receiver;
 wherein:
 the second at least one transmitter may send signals on various frequencies at various times;
 the second at least one receiver may receive the signals;
 the second at least one transmitter may encrypt the signals; and
 the second at least one receiver may decrypt the signals.

4. The system of claim 1, wherein:
 the at least one receiver is connected to an actuator; and
 the at least one transmitter is connected to a sensor the actuator is situated at a facility; and
 the sensor is situated at the facility; and
 wherein:
 the actuator may affect at least one parameter of a process at the facility; and
 the sensor may sense at least one parameter of the process.

5. The system of claim 4, further comprising a repeater to relay signals from the at least one transmitter to the at least one receiver, and from the second at least one transmitter to the second at least one receiver.

6. A method for secure wireless communication comprising:
 transmitting signals to a receiver;
 transmitting the signals via a frequency-hopping spread spectrum;
 providing a schedule of the frequency-hopping spectrum to the receiver;
 encrypting the signals to the receiver;
 providing an encryption key to the receiver via a second frequency-hopping spread spectrum; and
 changing the schedule of the frequency-hopping spectrum.

7. The method of claim 6, further comprising providing a schedule of the second frequency-hopping spread spectrum to the receiver.

8. The method of claim 7, further comprising:
 transmitting the signals to the second receiver via a third frequency-hopping spread spectrum; and
 providing a schedule of the third frequency-hopping spectrum to the second receiver.

9. The method of claim 8, further comprising:
 encrypting the signals being transmitted to the second receiver; and
 transmitting a second encryption key to the second receiver.

10. The method of claim 9, further comprising using a distributed control system to manage the transmitter, the second receiver, and/or signals.

11. The method of claim 10, wherein:
the receiver is connected to an actuator; and
the second transmitter is connected to a sensor.

12. The method of claim 6, further comprising using a software defined radio to manage the transmitter, the second receiver, and/or signals.

13. A system for secure wireless communication comprising:
a receiver;
a transmitter; and
a processor connected to the transmitter;
wherein:
the processor is configured to operate the transmitter to send encrypted signals via a frequency hopping spread spectrum of a first schedule;
the processor is configured to operate the transmitter to send an encryption key signal via a frequency hopping spread spectrum of a second schedule; and
the receiver is configured to receive and decrypt the signals.

14. The system of claim 13, further comprising:
a processor connected to the receiver;
a software radio connected to the transmitter and the receiver; and
a distributed control system connected to the computer.

15. The system of claim 13, wherein an encryption key of the encryption key signal may change upon an intrusion of signals.

16. The system of claim 13, wherein an encryption key of the encryption key signal changes according to a schedule.

* * * * *